United States Patent [19]
Ninet et al.

[11] Patent Number: 6,050,518
[45] Date of Patent: Apr. 18, 2000

[54] PROCESS FOR CONTROLLING THE LAYING OF ROVING BY WINDING OR CONTACT ON LARGE STRUCTURES AND MACHINE FOR PRACTICING THE SAME

[75] Inventors: Claude Alain Ninet, Pessac; Herve Le Gratiet, Saint Aubin de Medoc, both of France

[73] Assignee: Aerospatiale Societe Nationale Industrielle, Societe Anonyme, Paris, France

[21] Appl. No.: 09/229,768

[22] Filed: Jan. 14, 1999

[30] Foreign Application Priority Data

Jan. 14, 1998 [FR] France .................................. 98 00519

[51] Int. Cl.$^7$ .................................................. B65H 54/64
[52] U.S. Cl. ........................................ 242/436; 242/445.1
[58] Field of Search ..................................... 242/436, 437, 242/439.1, 445.1

[56] References Cited

U.S. PATENT DOCUMENTS

| | | |
|---|---|---|
| 3,106,504 | 10/1963 | Carter .................................. 242/436 X |
| 3,367,586 | 2/1968 | Eshbaugh ............................... 242/436 |
| 3,448,253 | 6/1969 | Bramblett, II et al. . |
| 3,577,294 | 5/1971 | David .................................. 242/436 X |
| 4,206,393 | 6/1980 | Chiba . |
| 4,610,402 | 9/1986 | Corbett et al. .......................... 242/436 |
| 5,396,821 | 3/1995 | Okumura et al. . |

FOREIGN PATENT DOCUMENTS

| | | |
|---|---|---|
| 0 191 655 | 8/1986 | European Pat. Off. . |
| 0 338 106 | 10/1989 | European Pat. Off. . |
| 0 350 645 | 1/1990 | European Pat. Off. . |
| 351054670 | 5/1976 | Japan .................................... 242/436 |
| 1430286 | 3/1976 | United Kingdom ................... 242/436 |

*Primary Examiner*—Donald P. Walsh
*Assistant Examiner*—Emmanuel M. Marcelo
*Attorney, Agent, or Firm*—Young & Thompson

[57] ABSTRACT

A process and apparatus for controlling the deposition of roving by winding or by contact on large structures, in which deposition is carried out on a mandrel (1) driven in rotation about its axis ($\theta$). A deposition head (6) is adjustable in position along at least a first rectilinear axis (X) of movement parallel to the axis of rotation ($\theta$) of the mandrel. The head (6) is also movable along a second axis of rectangular displacement (Y) orthogonal to the axis of the mandrel. The axis of rotation ($\theta$) of the mandrel is taken as a master axis and the other axes (X, Y, $\beta$, $\gamma$, 8, 9) are made subservient to the master axis. The master axis ($\theta$) is controlled by speed orders according to a pre-established program and from a pre-established trajectory table (21). The slave axes are made subservient as a function of the angular position of the master axis, from the instantaneous angular position of the master axis ($\theta$), by computing from the trajectory table (21), for each instantaneous position, the corresponding order values for each slave axis and by applying these orders to these slave axes.

12 Claims, 3 Drawing Sheets

6,050,518

PROCESS FOR CONTROLLING THE LAYING OF ROVING BY WINDING OR CONTACT ON LARGE STRUCTURES AND MACHINE FOR PRACTICING THE SAME

This application corresponds to French application 98 00519 of Jan. 14, 1998, the disclosure of which is incorporated herein by reference.

The present invention relates to the production of structures of composite material of large dimensions, and generally speaking, structures of evolving diameter such as for example rocket motor bodies, more commonly called holding receptacles.

A holding receptacle is a structure generally wound of composite material and constituted by a cylindrical sleeve connecting to ends, respectively the front and rear, for example hemispheric and each provided with a metallic base.

To produce such a structure, there is used a rigid rotatable mandrel which serves as a support for winding and which is withdrawn from the receptacle after polymerization of the resin of the composite material.

The mandrel is covered with roving deposited in wound layers or by contact, for example to produce localized reinforcement.

By roving is meant a group of continuous filaments or fibers, agglomerated, in the form of a ribbon or a strip, stored on a spool.

Generally, several rovings side by side are deposited simultaneously.

The present techniques for production of such receptacles with the aid of a mandrel disposed horizontally and driven in rotation by a special turret between the head stocks of which is mounted the mandrel, use a mode, called temporal, for control of an assembly of axes of mobility, in which the position, speed and acceleration instructions for each axis are a function of time.

Machines for winding/deposition on contact used for the production of these receptacles comprise a certain number of controlled motorized axles.

For winding, five axes are necessary, namely, an axis of rotation of the mandrel, which is to say the axis of symmetry of the receptacle to be produced, an axis of rectilinear displacement parallel to the axis of the mandrel of the winding head, an axis of rectilinear displacement of said head orthogonal to the axis of the mandrel, an axis of rotation of the head, so-called "elbow", vertical and orthogonal to the preceding axis, and, finally, an axis of rotation, so-called "wrist", of the head, orthogonal to the two preceding axes.

To carry out contact deposition, the machine should comprise two supplemental axes of rotation, parallel to the axis of the mandrel, respectively for displacement in altitude of the head and for the orientation of the head toward the axis of the mandrel to apply the latter against the deposition surface perpendicular to this latter.

In the temporal control mode, the position, speed and acceleration, for each axis, is a preprogrammed function of time and the role of the digital control of the machine is to provide a permanent interpolation of the parameters of the assembly of the axes so as to obtain as nearly as possible a following of the desired trajectories.

The control of the winding machine must respond, on the one hand, to the precision of following a predetermined trajectory and, on the other hand, to minimizing the cycle time for deposition by application of accelerations and decelerations to the assembly of axes permitting optimizing to the maximum the speed of deposition of the roving at all points along the mandrel, the speed of rotation of this latter increasing when the diameter on which deposit takes place decreases.

To these requirements must be added, as is the case at present for containers of large dimensions, taking into account the diameters and inertia that can be very great. By way of illustration, the invention foresees the production of receptacles that can exceed in diameter 5 meters and have a moment of inertia of the order of 800,000 $N.m^2$ or more.

Accounting for these different criteria uniquely complicates the control and especially its temporal mode.

Thus, if the positional control along several relatively low loaded axes is controlled by conventional digital controls at present, each axis being controlled independently of the others, on the other hand, the simultaneous control by this mode of several axes of which at least one is heavily loaded and not infinitely rigid, is difficult or even impossible beyond a certain inertia.

In the case of winding of large containers, it is evident that the axis of the mandrel, as well as the assembly of the transmission, from the drive motor to the mandrel, which are heavily loaded because it is necessary that at each time of taking a sample, the axis of the mandrel will be in the program position, simultaneously with the other axes, which are less loaded, to describe the defined trajectory.

With this type of control, there is a time offset between the command given to the motor and the reaction of the mandrel, which plays the role of a spring and stores a portion of the energy supplied by the motor.

Each time the motor is to accelerate, torsion is produced in the assembly of the transmission line, which delays the mandrel reaching the control position. This can be compensated by systems anticipating the first and second order, but at the price of very fine adjustment, as a function of the rigidity and torsion of the transmission and of its inertia.

Unfortunately, these parameters vary not only from one container to another, but also for a same container, in the course of winding, because of the importance of the mass of composite deposited on the periphery, the inertia of the deposited composite being for example more than 10% of the total inertia at the end of winding, which means that the motor drive must be subjected to a variation of inertia of more than 10% between the beginning and the end of winding.

There inevitably appears, with this type of control, "pumping" phenomena upon following the trajectories, which does not permit obtaining the desired compromise between speed and acceleration and precision and which moreover can result, from mechanical overloading in the mechanical transmission chain, in damage or destruction of this latter.

In extreme cases, if it is desired to achieve the desired precision, there is a risk of instability in positioning the mandrel. Thus, the necessary orders to obtain the best compromise time of cycle/precision excite the resonance frequency of the mechanical transmission of the mandrel. This phenomenon is aggregated by the increase in diameter, which requires a more precise angular positioning.

The present invention aims precisely to permit the winding/contact deposit of large containers by using a control process overcoming the drawbacks and limits of temporal control.

To this end, the invention has for its object a control process for the deposit of roving by winding or contact on large structures, in which the deposit is effectuated on a mandrel driven in rotation about its axis by a suitable support/drive device, with the help of a suitable deposition head, adjustable in position according to at least one first rectilinear displacement axis parallel to the axis of rotation of the mandrel and a second rectilinear displacement axis orthogonal to said axis of the mandrel, characterized in that it consists:

in taking as the master axis, the axis of rotation of the mandrel and making the other axes subservient to the master axis, in controlling the master axis by the speed orders according to a pre-established program, and, from a pre-established trajectory table integrating the movement of the master axis and giving for each slave axis the values of orders corresponding to predetermined angular positions of the master axis, making the slave axes subservient as a function of the angular position of the master axis, from the instantaneous angular position of the master axis by computing from said trajectory table, for each instantaneous position, the corresponding order values of each slave axis and by applying these orders to said slave axes.

The essential advantages of such a control mode are a total stability of the mandrel and hence better precision in deposition of the roving because the latter takes place as a function of the real position of the mandrel and no longer depends on an order of computed position.

This control is well-adapted to winding large structures having high inertia.

The invention also has for its object a machine for practicing the above process, comprising:

means to support and drive a mandrel in horizontal rotation about its axis;

a deposition head for roving, movable along at least one first axis of rectilinear displacement parallel to the axis of the mandrel and a second axis of rectilinear displacement orthogonal to the mandrel axis;

a rack of spools of roving supplying said head;

computerized command/control means including digital control and its control panel;

characterized in that said digital control comprises an order generator connected to the control means of the various axes of rotation or displacement, an interpolator, a speed control and a trajectory table, an incremental coder for the instantaneous angular position of the rotatable assembly of the mandrel being connected to said interpolator.

According to one embodiment, the deposition head is moreover orientable relative to the mandrel along at least one axis of rotation and, preferably, along so-called elbow axis, vertical and orthogonal to said second displacement axis, and a so-called wrist axis, orthogonal to the two latter axes.

According to a modification permitting both the deposition by winding and deposition by contact, the machine comprises moreover at least one axis of rotation to orient the deposition head relative to the mandrel.

Preferably, and to permit contact deposition that is more easy and more precise, the machine comprises two supplemental axes of rotation of the deposition head parallel to the axis of the mandrel, respectively for displacement in altitude of the head and for an orientation of this latter in the direction of the axis of the mandrel.

The deposition head is preferably mounted interchangeably especially to replace a contact deposition head with a head for deposition by winding.

The coder device for the instantaneous angular position of the mandrel assembly comprises a single coder mounted preferably on the mandrel, but it could also equally be mounted on the motor shaft, or two coders, one mounted on the mandrel, the other on the motor shaft.

According to still another characteristic of the machine, a decoupling is effected for the rectilinear displacements of the deposition head parallel to the mandrel axis, by positioning the head and the tensioning device for the roving on a winding carriage mounted for movement parallel to the axis of the mandrel on a following carriage itself mounted movably parallel to said mandrel axis. Such an arrangement permits a high acceleration of the deposition head without requiring the movement of the large mass of the roving spools.

Other characteristics and advantages will become apparent from the description which follows, of the process of the invention and of means for practicing it, which description is given by way of example only, and with respect to the accompanying drawings, in which.

Figure 1:
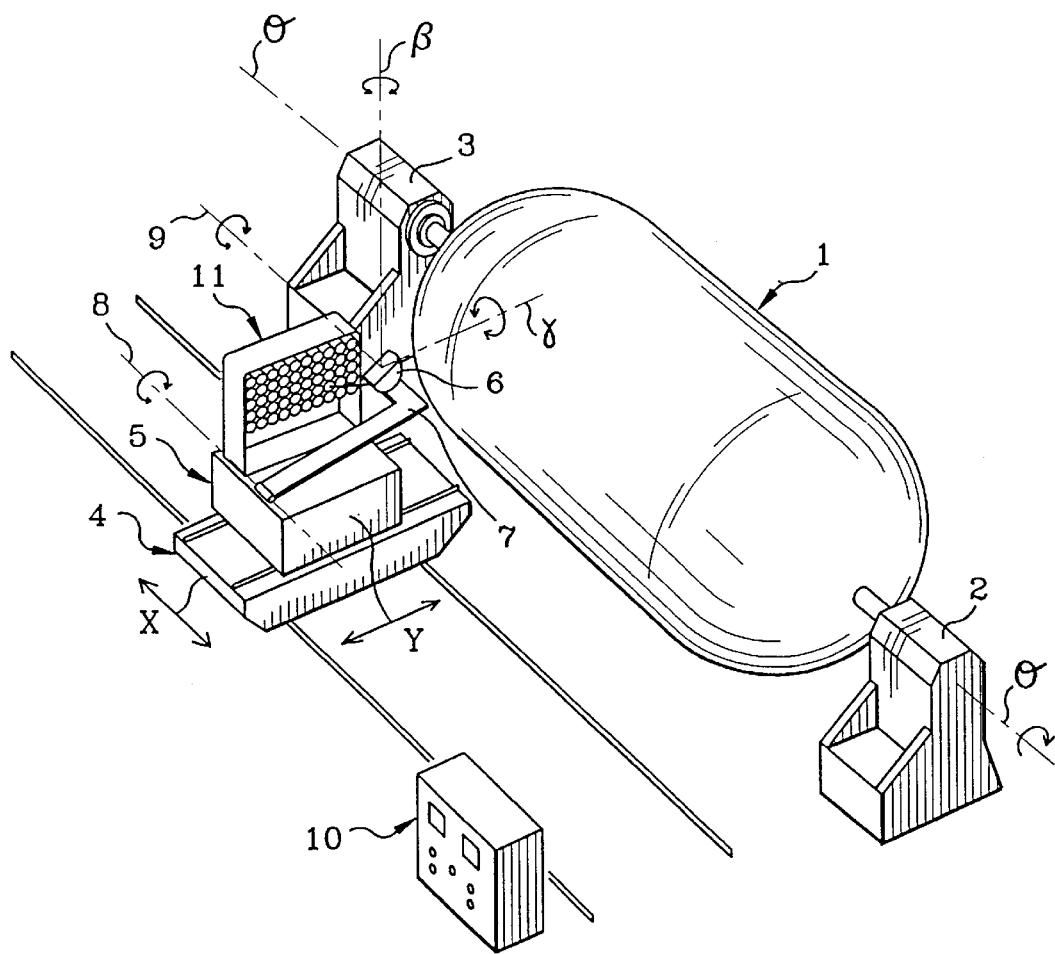
FIG. 1 is a schematic perspective view of a winding/contact deposition machine for large containers.

In FIG. 1, there is shown at 1 a mandrel adapted to service a support for winding a large container, for example a cylindrical sleeve provided with front and rear hemispherical ends, 5 to 6 meters in diameter and of a length of about 12 meters.

The mandrel 1 is mounted horizontally between two head stocks 2 and 3, of which one (2) is motor-driven, the axis of the head stocks, designated by θ, coinciding with the axis of the mandrel 1.

The motor-driven head stock 2 is fixed, however the other head stock 3 is movable linearly in the direction of the fixed head stock 2 for the reception of mandrels of various lengths, according to the size of container to be made.

Laterally of the mandrel 2, and parallel to the axis θ of this latter, in the direction X, a first carriage 4 can move, carrying a second carriage 5, movable on the carriage 4 in horizontal direction Y, orthogonal to axis θ.

The second carriage 5 carries a winding-contact deposit head 6 mounted at the end of an arm 7 directed toward the mandrel 1 and mounted swingably at its other end on the carriage 5, about an axis 8 parallel to the axis θ.

The head 6 is moreover mounted rotatably at the end of the arm about 3 cartesian axes, namely a vertical axis β, called an elbow, a horizontal axis γ orthogonal to axis θ, called a wrist, and a horizontal axis 9 of orientation of the head 6 in the direction of the axis θ.

The machine schematically shown in FIG. 1 thus comprises seven axes of mobility permitting the head 6 suitably to carry out winding or contact deposition.

Of course, the arrangement shown to obtain the seven axes of movement is merely illustrative because different known kinematic arrangements are possible to give to the deposition head 6 the desired number of axes.

Each axis is directed and controlled by a suitable means, in particular an electric motor.

The mandrel 1 is driven by a kinematic chain comprising an electric motor driving by means of a reducer a shaft secured to the mandrel.

A speed changer permits adjusting the speed of rotation of the motor shaft.

The other axes comprise drive means mounted respectively on the carriages 4, 5, the arm 7 and the deposition head 6.

All these means are connected to a control panel shown schematically at 10 in which are gathered the digital control of the machine, as well as all the devices for control and display necessary for automated operation and supervision permitting the assembly of the interactions with the operator with the aid of specific supervision software and, generally speaking, all the direction, control, signalling and operating means of the machine.

On the carriage 5 is mounted an assembly 11 for supplying roving to the deposition head 6, comprising a set of spools and a device for tensioning the roving delivered to the deposition head.

The machine should be able to carry out as needed a longitudinal winding, with a deposition angle that can vary between 0° and 90°, a circumferential winding and a contact winding, and this for roving that is pre-impregnated or not.

Each roving comes from a spool of the set 11 and several rovings are grouped at the level of the tensioning device to form a layer delivered to the deposition head 6.

The winding and contact deposition require two separate heads 6, for which reason the head is mounted removably on the arm 7.

For winding operations, the axes 8 and 9 are immobilized and the machine uses five axes, namely, the axes θ, X, Y and β, γ, the head being adapted to be oriented along the axis of the layer which is being wound on the mandrel 1.

For operations of contact deposit, the seven axes are used, the head 6 being able to be positioned as to altitude relative to the axis θ and in the direction of this latter so as to come into contact with the mandrel at a normal to the surface at the point of contact.

The assembly of the installation described above is well known, both as to its structure and as to its operation, and need not be described in greater detail.

The system usually operates, for example for winding, according to a so-called temporal control mode in which each axis θ, X, Y, β, γ is controlled independently of each other, as a function of time, from pre-established curves of trajectories.

If such control is suitable to provide the wound structures of small or medium dimensions for which the winding machine has no strongly loaded axis, the same is not true for structures of large dimensions because of their mass, which loads too greatly one of the axes, in this case the axis 0 of rotation of the mandrel support, which gives rise, as mentioned above, to errors of positioning of the mandrel which give rise to an incorrect deposit of the roving by the deposition head on said mandrel.

According to the invention, instead of temporal control, there is used a control of the master-slave type in which the thus-loaded axis, namely the axis θ for driving in rotation the mandrel 1, is taken as the master axis and is subjected to speed-acceleration according to pre-established orders, and the other axes, X, Y, β, γ and if desired 8 and 9, are in slave relationship and subjected to the position of the axis θ with the help of trajectory tables that are also pre-established and from information supplied by a coder device as to the instantaneous angular position of the mandrel in the course of its rotation.

Figure 2:
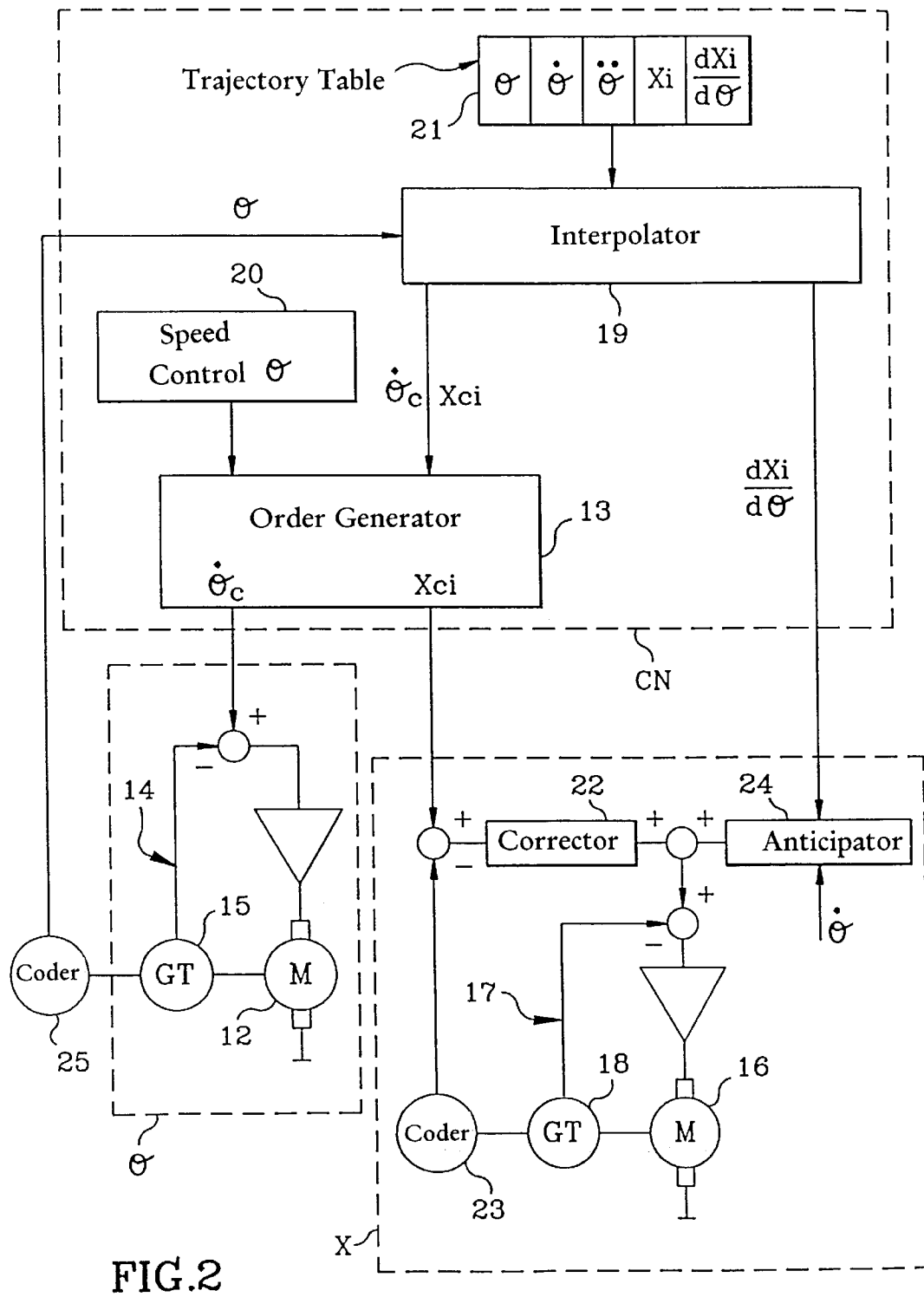
FIG. 2 is a block diagram showing the control principle of the invention.

There is shown schematically in FIG. 2 a block diagram of this control mode.

In this FIG. 2 is shown at 12 the electric drive motor for the mandrel 1, connected to an order generator 13 by means of a speed subjection loop 14 comprising particularly a tachometric generator 15.

The order generator 13 is also connected in parallel to each slave axis and more precisely to each motor involved with the axes X, Y, β, γ, 8 and 9.

For purposes of clarity, a single motor means, in this instance the electric motor 16 associated for example with the displacement in the X direction of the carriage 4, is shown in FIG. 2. In parallel with the chain of subjection X are connected to the order generator 13 the other subjection chains Y, β, γ, 8 and 9 (not shown).

Each chain such as X comprises a loop 17 subject to speed, comprising a tachometric generator 18.

The order generator 13 receives values of orders computed by an interpolator 19 and weighted by a speed control factor θ displayed by a potentiometric control shown schematically at 20.

The interpolator 19 is connected to a trajectory table 21, given in CFAO and loaded into the memory of the digital control CN of the machine.

The trajectory table 21 establishes the correspondence between the positions of each slave axis and the incremental positions of the axis θ in the course of its rotation, to carry out the winding-deposition program in question.

The axis θ is controlled as to speed and graphic representation of the variation of speed θ with time is carried out by approximations by parabolic arcs and by segments (for speed levels), although the graphical representations of evolution of the other axes (X, Y, β, γ, 8, 9) relative to θ are straight segments, the slopes of the variations of positions of the axes relative to θ (denoted $dXi/d\theta$) being constant for each axis.

The speed control of the mandrel is pre-established as a function of the characteristics of the capacity to be provided and after modelling the kinematic chain constituted by the mandrel 1, its drive shaft, the drive motor 12 and its reducer, as well as the speed varying system (loop 14).

This modelling permits determining the transfer function of the motor-mandrel system and serves to define the useful variables which will then be used to establish said trajectory table 21.

Loops for responding to the position of the X axis are provided and constituted by a proportional integral corrector filter 22 using the position error (with the help of a coder 23 connected to the tachometric generator 18) and an anticipator filter 24, of the first and second order, the filters 22 and 24 being connected respectively to the order generator 13 and to the interpolator 19.

The interpolator 19 recovers, by an incremental coder device 25 connected to the tachometric generator 15, the real position of the axis θ of the mandrel 1. By searching and using the trajectory table 21, it computes the theoretical orders for the speed of θ (θc) and the positions (Xci) of the other axes (X, Y, β, γ, 8, 9).

Moreover, it gives to the anticipators (24) of the other axes the values of the slope ($dXi/d\theta$) of each axis for the winding-deposition segment of the moment.

The order generator 13 recovers the motor values computed by the interpolator 19, weighs them, as indicated above, by the speed control factor of θ and acts on the loops subject to θ and the other axes (X, Y, β, γ, 8, 9).

The corrector and anticipator filters 22 and 24 recover the orders computed by the generator 13, the slopes given by the interpolator 19 and the data from the coders (23) to compute the controls of the motors (16).

The coder device 25 can comprise a single coder associated with the motor 12, as shown in FIG. 2, or with the mandrel 1, or again two separate coders associated one with the motor 12 and the other with the mandrel 1, in this latter case the signal sent to the digital control CN being a function of the two coders.

If the coder 25 is on the motor 12, it must take account during modellization of the kinematic chain, of the torsion of the transmission shaft.

It is moreover necessary that the position coder 25 be of high resolution and have a number of points as high as possible, so as to achieve the precision and the resolution required for depositing the roving.

Such a control mode ensures total stability of the mandrel 1 and hence better precision in the deposition of the roving because the latter takes place as a function of the real position of the mandrel and no longer according to a position order computed for each axis.

Thus, there is effected for the axis θ, which is the most highly loaded, a high control precision and, the other axes having negligible inertia and flexibility, their positional control from the orders issued from the computation is easy to carry out. No matter what the flexibility of the axis θ and its difficulty of being located at a programmed position at a given instant, it is certain that the axes X, Y. β, γ, 8, 9 will be in accord with θ.

This control mode knows no limitation in terms of inertia and flexibility of the axis θ and requires no particular adjustment when the inertia of the container or structure to be wound changes.

It is moreover altogether suitable for the successive description of identical deposition methods, as is the case in winding, in which one layer is constituted by a repetition of n loops described according to the same trajectory, each loop following continuously the previous loop.

However, the parameter of evolution of following the trajectory being the rotation of the axis of the mandrel, control according to the invention is limited below a speed threshold of rotation of the axis θ. This situation can be encountered in the case of contact deposition or in the case of winding at too small an angle of deposition or zero angle (longitudinal winding).

This can be partially remedied by reference to a coder 25 of very high resolution.

More generally, it will be necessary, according to another characteristic of the machine of the invention, to switch the latter from the control mode of the master-slave type to the conventional temporal mode.

To this end, and in a very simple manner, the digital control CN is programmed to substitute at the inputs of the order generator 13, a speed control for each axis X, Y, β, γ, 8, 9 which is independent, as a function of time, instead of and in place of the elements 13, 19, 20 and 21 of FIG. 2. Such a speed control operates by simple reading of a trajectory table comprising the positions in time computed for each of said axes.

The switching also permits winding for example by the same machine, of containers with low inertia (with temporal control) and receptacles of high inertia (with master-slave control).

Figure 3:
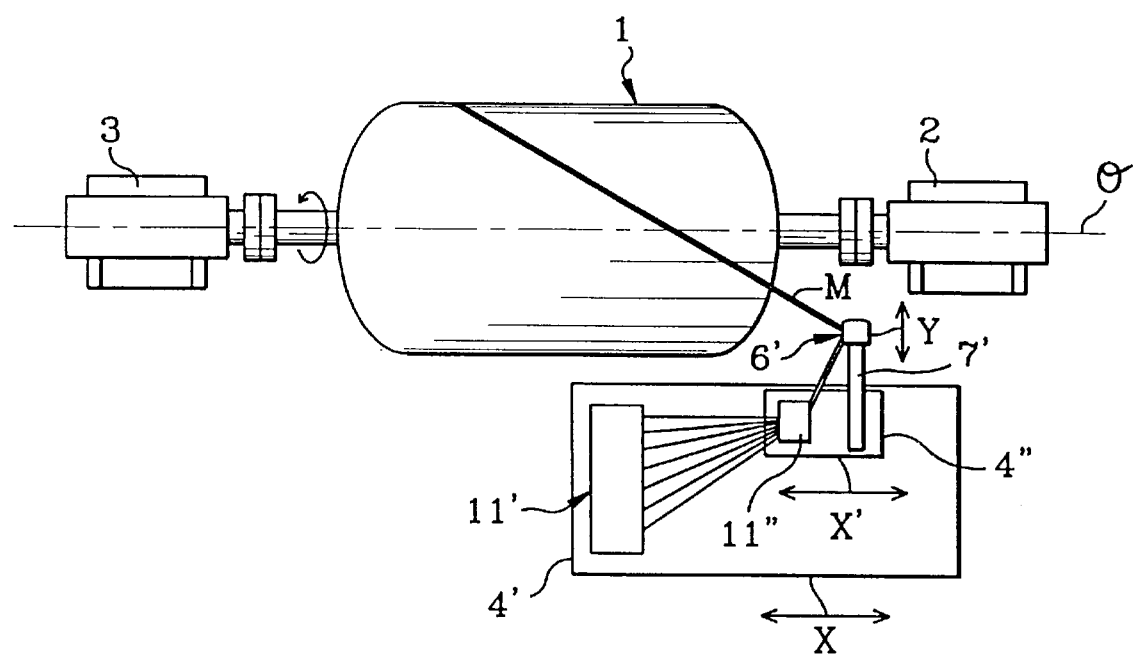
FIG. 3 is a schematic view showing the principle of decoupling of the displacement parallel to the axis of the mandrel and of the spool-deposition head assembly.

FIG. 3 shows a modified embodiment of the machine, in which a decoupling of the displacement according to the axis X has been carried out.

To this end, the carriage 4' movable in the X direction carries the spool stand 11' as well as a carriage 4", so-called for a winding, movably mounted on the carriage 4' along an axis X' parallel to X.

The carriage 4" carries an oscillating arm 7' analogous to arm 7, as well as the stand 11' for tensioning and presentation of the roving to the deposition head 6' at the end of the arm 7'. The pivoting of the arm 7' ensures the displacement in the Y direction of the deposition head of the rovings M onto the mandrel 1.

Such an arrangement permits a high acceleration of the deposition head without involving a displacement of the high mass of the spools on the stand 11' mounted on the follower carriage 4' which moves less slowly than the carriage 4".

Of course, the invention is not limited to the embodiments shown and described above, but on the contrary covers all variations and is applicable to other configurations of machines, in particular as concerns the various axes of movement of the deposition head relative to the mandrel.

What is claimed is:

1. A process for controlling the deposition of roving by winding or contact on large structures, in which the deposition is carried out onto a mandrel (1) driven in rotation about its axis (θ) by a support/drive device, with a deposition head (6) adjustable in position along at least one first rectilinear axis of displacement (X) parallel to the axis of rotation (θ) of the mandrel and a second rectilinear displacement axis (Y) orthogonal to said axis of the mandrel, comprising using as a master axis the axis of rotation (θ) of the mandrel (1) and making the other axes (X, Y, β, γ, 8, 9) subservient to said master axis, controlling the master axis (6) by speed orders according to a pre-established program, and, from a pre-established trajectory table (21) integrating the kinematic of the master axis and giving for each slave axis the values of orders corresponding to predetermined angular positions of the master axis, to make subservient the slave axes as a function of the angular position of the master axis, from the instantaneous angular position of the master axis (θ), by computing from said trajectory table (21), for each instantaneous position, the corresponding control values of each slave axis and by applying these orders to said slave axes.

2. In a machine for practicing the process according to claim 1, comprising:

means (2, 3) to support and drive a mandrel (1) in rotation about its horizontal axis (θ);

a head (6) for depositing roving, movable along at least one first rectilinear axis of movement (X) parallel to the axis (θ) of the mandrel and a second rectilinear displacement axis (Y) orthogonal to the axis of the mandrel;

a set (11) of spools of mesh supplying said head (6);

means (10) for computerized control including a digital control (CN) and its control panel;

the improvement wherein said digital control (CN) comprises a generator (13) connected to the control means of the various axes of rotation or displacement (θ, X, Y), and interpolator (19), a speed control (20) and a trajectory table (21), an incremental coder device (25) for the instantaneous angular position of the rotatable assembly of the mandrel being connected to said interpolator (19).

3. Machine according to claim 2, which has at least one axis of rotation (β) of the deposition head (6).

4. Machine according to claim 3, which also has an axis of rotation (β) of the head (6), vertical and orthogonal to the second axis of displacement (Y) and an axis of rotation (γ) of the head (6) orthogonal to the two last axes.

5. Machine according to claim 4, which also has two supplemental axes (8, 9) of rotation of the deposition head (6) parallel to the axis (θ) of the mandrel (1), so as to permit contact deposition by a deposition head.

6. Machine according to claim 2, wherein the coder device comprises a coder associated with a motor (12) for driving the mandrel (1).

7. Machine according to claim 2, wherein the coder device comprises a coder associated with the mandrel (1).

8. Machine according to claim 2, wherein the coder device comprises two coders associated one with the motor (12) for driving the mandrel (1) and the other with the mandrel (1).

9. Machine according to claim 2, wherein the drive motor (12) for the mandrel (1) is subject to a speed loop (14).

10. Machine according to claim 2, wherein the control motor of each slave axis (X, Y, β, γ, 8, 9) is subject to a speed loop (17).

11. Machine according to claim 10, wherein each slave axis (X, Y, β, γ, 8, 9) is moreover controlled as to position by a proportional and integral corrective filter (22) that takes account of the positional errors detected by a coder (23) and by an anticipator filter (24).

12. Machine according to claim 2, wherein decoupling is effected as to the rectilinear displacements (X) of the deposition head (6) parallel to the axis (θ) of the mandrel, by positioning the head (6') and a device for tensioning the roving (11') on a winding carriage (4") mounted for movement parallel to the axis of the mandrel on a follower carriage (4') itself mounted movably parallel to said axis of the mandrel.

* * * * *